(12) United States Patent
Yokoyama et al.

(10) Patent No.: US 12,008,284 B2
(45) Date of Patent: Jun. 11, 2024

(54) INFORMATION PRESENTATION CONTROL DEVICE

(71) Applicant: DENSO CORPORATION, Kariya (JP)

(72) Inventors: Shizuka Yokoyama, Kariya (JP); Asako Nagata, Kariya (JP); Takeshi Yamamoto, Kariya (JP); Yuji Ota, Kariya (JP)

(73) Assignee: DENSO CORPORATION, Kariya (JP)

( * ) Notice: Subject to any disclaimer, the term of this patent is extended or adjusted under 35 U.S.C. 154(b) by 286 days.

(21) Appl. No.: 17/541,568

(22) Filed: Dec. 3, 2021

(65) Prior Publication Data

US 2022/0091807 A1 Mar. 24, 2022

Related U.S. Application Data

(63) Continuation of application No. PCT/JP2020/009386, filed on Mar. 5, 2020.

(30) Foreign Application Priority Data

Jun. 7, 2019 (JP) .................................. 2019-107265

(51) Int. Cl.
*G06F 3/14* (2006.01)
*B60K 35/00* (2006.01)
*B60K 35/20* (2024.01)
*B60K 35/28* (2024.01)
*B60K 35/81* (2024.01)
(Continued)

(52) U.S. Cl.
CPC ................ *G06F 3/14* (2013.01); *B60K 35/00* (2013.01); *B60W 50/14* (2013.01); *B60W 60/0053* (2020.02); *B60K 35/20* (2024.01); *B60K 35/28* (2024.01); *B60K 35/81* (2024.01); (Continued)

(58) Field of Classification Search
CPC ..... G06F 3/14; B60W 40/08; B60W 60/0053; B60W 60/0057; B60W 50/14; G11B 27/10; G11B 20/10; H04N 5/93
See application file for complete search history.

(56) References Cited

U.S. PATENT DOCUMENTS

2016/0121907 A1* 5/2016 Otake ............... B60W 60/0053
701/23
2019/0011914 A1* 1/2019 Park ...................... B60W 40/08

FOREIGN PATENT DOCUMENTS

CN 107298105 A * 10/2017 ............ B60W 40/00
JP 2009182473 A * 8/2009 ............. G11B 20/10
(Continued)

*Primary Examiner* — Yuri Kan
(74) *Attorney, Agent, or Firm* — Harness, Dickey & Pierce, P.L.C.

(57) ABSTRACT

An information presentation control device controlling information presentation to a driver in a vehicle equipped with autonomous driving function is provided. The information presentation control device is configured to: obtain a margin of the driver until an execution of driving change in which the driver takes over the at least partial driving task being performed by the autonomous driving; control a playback mode of a content presented by the information presentation device; stop the content, which is in a playback state, at a stop position in response to the execution of driving change; and set, according to the margin of the driver, a restart position of the content to which the content is rewound from the stop position to restart a playback of the content.

11 Claims, 11 Drawing Sheets

(51) Int. Cl.
*B60W 50/14* (2020.01)
*B60W 60/00* (2020.01)

(52) U.S. Cl.
CPC .. *B60K 2360/151* (2024.01); *B60K 2360/175* (2024.01); *B60W 2050/146* (2013.01)

(56) References Cited

FOREIGN PATENT DOCUMENTS

| | | | | | |
|---|---|---|---|---|---|
| JP | 5026294 | B2 | * | 9/2012 | ............. G11B 20/10 |
| JP | 2013004124 | A | * | 1/2013 | ............. G11B 27/10 |
| JP | 2017-178131 | A | | 10/2017 | |

* cited by examiner

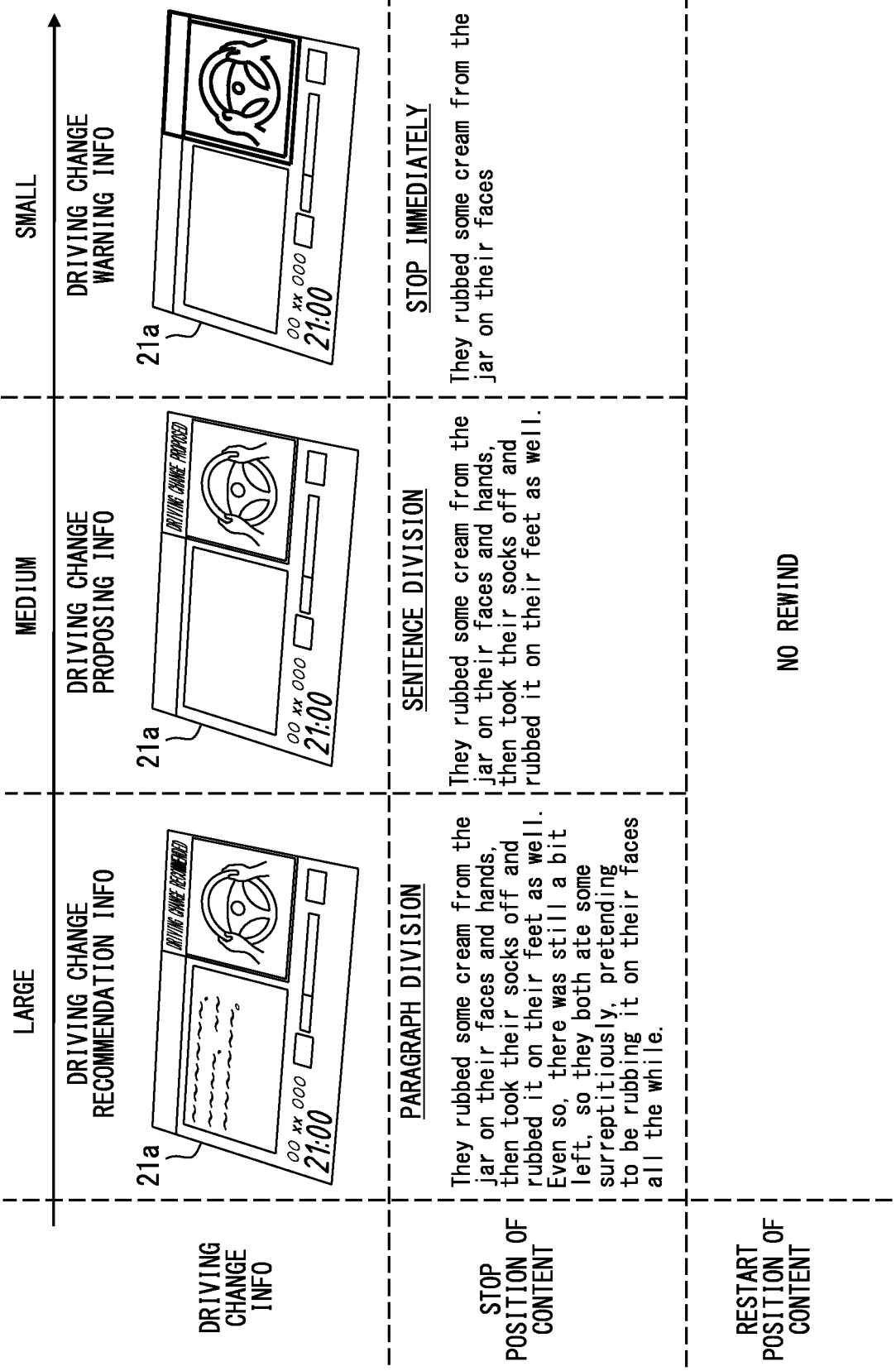

INFORMATION PRESENTATION CONTROL DEVICE

CROSS REFERENCE TO RELATED APPLICATIONS

The present application is a continuation application of International Patent Application No. PCT/JP2020/009386 filed on Mar. 5, 2020, which designated the U.S. and claims the benefit of priority from Japanese Patent Application No. 2019-107265 filed on Jun. 7, 2019. The entire disclosures of all of the above applications are incorporated herein by reference.

TECHNICAL FIELD

The present disclosure relates to an information presentation control device.

BACKGROUND

There has been known an information presentation control device that controls an information presentation device to presents information to a driver of a vehicle.

SUMMARY

The present disclosure provides an information presentation control device controlling information presentation to a driver in a vehicle equipped with autonomous driving function. The information presentation control device is configured to: obtain a margin of the driver until an execution of driving change in which the driver takes over the at least partial driving task being performed by the autonomous driving; control a playback mode of a content presented by the information presentation device; stop the content, which is in a playback state, at a stop position in response to the execution of driving change; and set, according to the margin of the driver, a restart position of the content to which the content is rewound from the stop position to restart a playback of the content.

BRIEF DESCRIPTION OF DRAWINGS

Objects, features and advantages of the present disclosure will become apparent from the following detailed description made with reference to the accompanying drawings. In the drawings:

FIG. 11 is a diagram schematically showing a relationship among driving change information, a stop point, a restart point, and a margin according to a second modification example.

DETAILED DESCRIPTION

Figure 1:
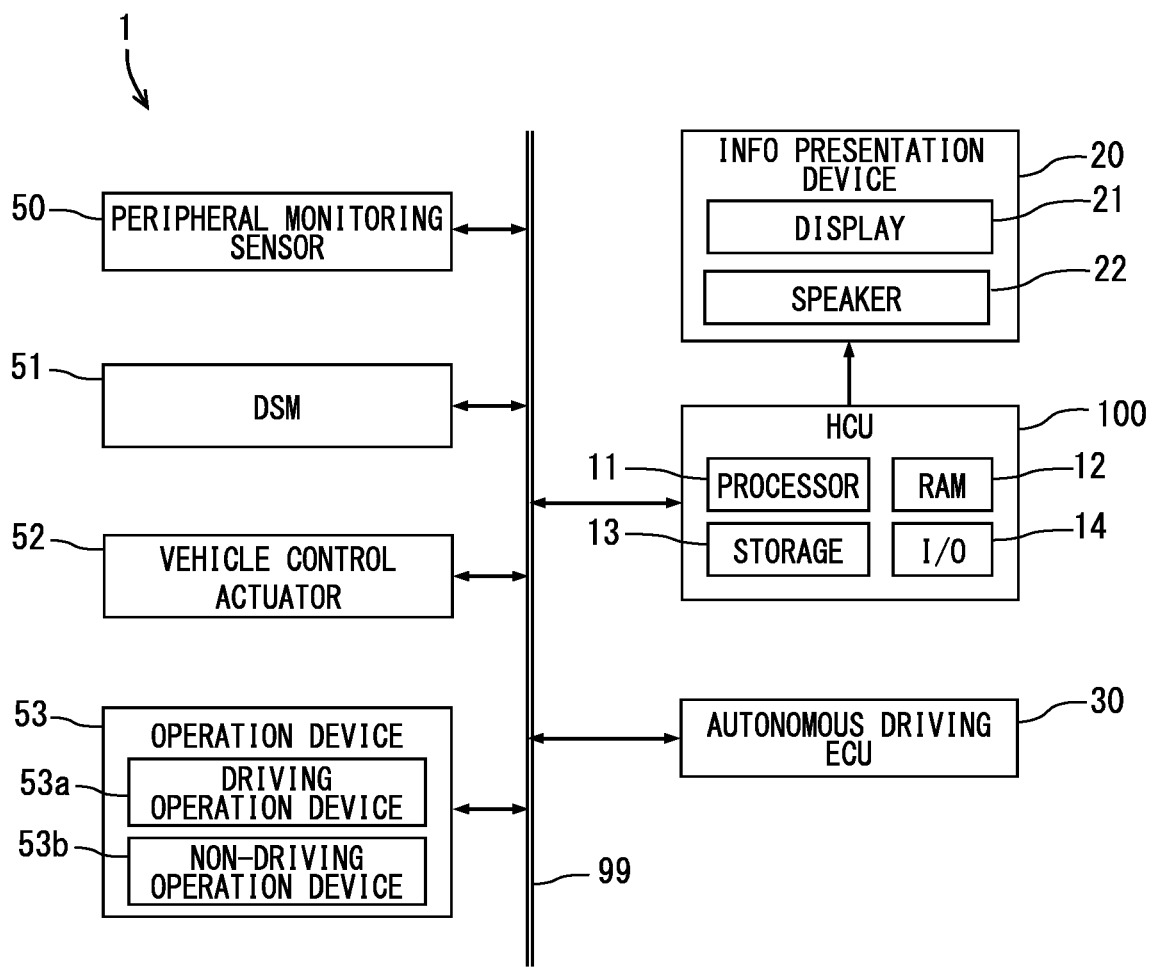
FIG. 1 is a diagram showing a schematic configuration of an in-vehicle network including a HCU according to a first embodiment of the present disclosure.

Vehicles equipped with an autonomous driving function and an advanced driving support function that allow the vehicle control unit to perform at least a part of driving tasks are rapidly becoming widespread. In such vehicles, an information presentation control device that controls an information presentation device to presents information to a driver has been known. This kind of information presentation control device permits a display of content in an upper display area of a vehicle's windshield in order to assist a smooth driving change from a state in which a vehicle control unit performs the driving task to a state in which the driver performs the driving operation.

In a case where a subject of the driving operation is switched from the vehicle control unit to the driver, a content presented by the information presenting device may continue to be presented without stop. However, in a case where the content continues to be presented to the driver, the driver who pays attention to the change of driving operation may temporarily miss the content presented in visual or audio manner. As a result, the driver may fail to smoothly recognize the presented content.

An object of the present disclosure is to provide an information presentation control device that enables a driver to smoothly recognize presented content in a situation where driving operation by a vehicle control unit is changed to the driving operation by a driver.

According to an aspect of the present disclosure, an information presentation control device, which controls an information presentation device presenting information to a driver in a vehicle, is provided. The vehicle is configured to perform at least partial driving task by a vehicle control unit. The information presentation control device includes: a margin obtaining unit obtaining a margin of the driver until an execution of driving change in which the driver takes over the at least partial driving task being performed by the vehicle control unit; and a playback mode control unit controlling a playback mode of a content presented by the information presentation device. The playback mode control unit: stops the content, which is in a playback state, at a stop position in response to the execution of driving change; and sets, according to the margin of the driver, a restart position of the content to which the content is rewound from the stop position to restart a playback of the content.

In the above configuration, the playback of content is stopped at the stop position in response to the driving change, and then the content is rewound from the stop position by predetermined amount and then the playback of content is restarted from the restart position. By the rewinding of content, the temporarily overlooked part of displayed content or temporarily missed part of audio content can be played back again. Then, the restart position at which the playback is restarted is determined according to the driver's margin until the driving change. Since the playback position is set according to the margin of the driver, the playback part can be optimized with consideration of the visually overlooked part or audibly missed part. Thus, with the above-described configuration, the driver can smoothly recognize the content in a case where the driving change is performed.

According to another aspect of the present disclosure, an information presentation control device, which controls an information presentation device presenting information to a driver in a vehicle, is provided. The vehicle is configured to perform at least partial driving task by a vehicle control unit. The information presentation control device includes: a margin obtaining unit obtaining a margin of the driver until an execution of driving change in which the driver takes over the at least partial driving task being performed by the vehicle control unit; and a playback mode control unit controlling a playback mode of a content presented by the information presentation device. The playback mode control unit: sets a stop position of the content according to the margin of the driver; and stops the content, which is in a playback state, at the stop position in response to the execution of driving change.

In the above-described configuration, the playback of content is stopped at the stop position in response to the driving change. The stop position at which the playback is stopped is determined according to the driver's margin until the driving change. By playing back the content as much as possible according to the driver's margin and stopping at an appropriate stop position, it is possible to suppress overlook of displayed content or missing of audio content from being occurred. Thus, with the above-described configuration, the driver can smoothly recognize the content in a case where the driving change is performed.

The following will describe embodiments of the present disclosure with reference to accompanying drawings. It is noted that the same reference symbols are attached to the corresponding constituent elements in each embodiment, and redundant explanation may be omitted. In each of the embodiments, when only a part of the configuration is described, the remaining parts of the configuration may adopt corresponding parts of other embodiments. Further, not only the combinations of the configurations explicitly shown in the description of the respective embodiments, but also the configurations of multiple embodiments can be partially combined even when they are not explicitly shown as long as there is no difficulty in the combination in particular.

First Embodiment

Figure 2:
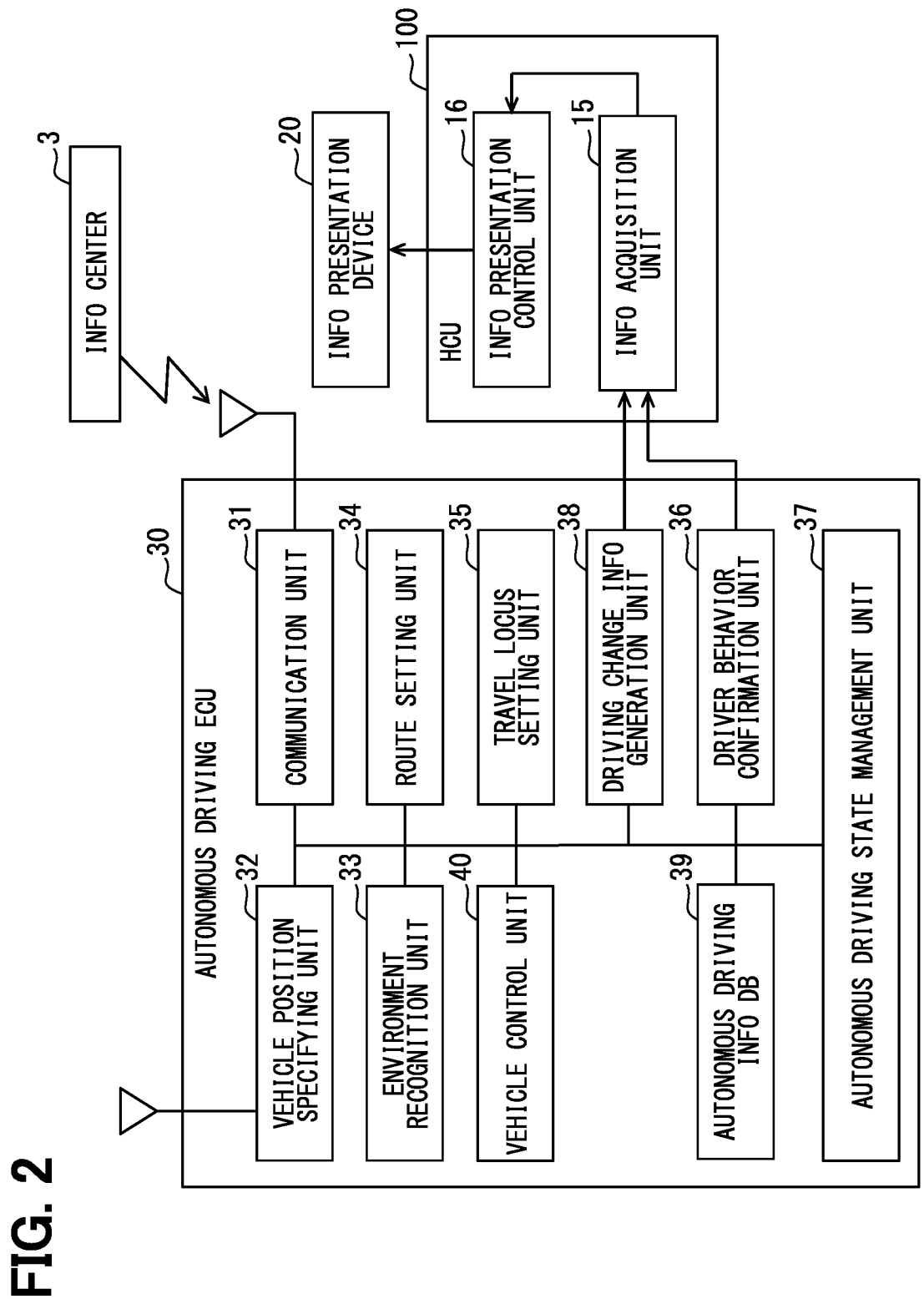
FIG. 2 is a diagram showing a schematic configuration of the HCU and an autonomous driving ECU according to the first embodiment.

As shown in FIG. 1 and FIG. 2, an information presentation control device according to a first embodiment of the present disclosure is provided by a human machine interface control unit (HCU) 100. The HCU 100 constitutes, together with an information presentation device 20, an information presentation system used in a vehicle 1.

The HCU is an electronic control device that performs an information presentation function. In one example, the HCU 100 used in the vehicle 1 is mounted on the vehicle 1. The HCU 100 is communicably connected to a communication bus 99 of an in-vehicle network mounted on the vehicle 1. The HCU 100 is one of nodes connected to the in-vehicle network. For example, multiple nodes are connected to the communication bus 99 of the in-vehicle network, and the multiple nodes may include a peripheral monitoring sensor 50, a driver status monitor (DSM) 51, a vehicle control actuator 52, an operation device 53, an autonomous driving electric control unit (autonomous driving ECU) 30, and the like. The multiple nodes connected to the communication bus 99 can communicate with each other.

The peripheral monitoring sensor 50 is an autonomous sensor that monitors a surrounding environment of the vehicle 1. The peripheral monitoring sensor 50 detects, from a detection range around the vehicle, moving objects and stationary objects. For example, the moving objects include other vehicles, pedestrians, cyclists, non-human animals and the like. The stationary objects include roadside structures, falling objects on the road, guardrails, curbs, and road markings such as traveling lane markings. The peripheral monitoring sensor 50 provides detection information indicating detection of an object around the vehicle 1 to the autonomous driving ECU 30 via the communication bus 99.

The peripheral monitoring sensor 50 includes a front camera, one or more millimeter wave radars, and the like as detection configurations for object detection. The front camera outputs, as detection information, at least one of image data obtained by photographing a front range of the vehicle 1 or an analysis result of the image data. The millimeter wave radars may be arranged on front and rear bumpers of the vehicle 1 at intervals from each other. For example, the millimeter wave radars emit millimeter waves or quasi-millimeter waves toward a front range, a front side range, a rear range, a rear side range of the vehicle 1. The millimeter wave radar generates detection information by a process of receiving reflected waves reflected by moving objects, stationary objects, or the like. The peripheral monitoring sensor may further include detection configurations such as a LIDAR and/or a sonar.

The DSM 51 includes a near infrared light source, a near infrared camera, and a control unit for controlling the near infrared light source and the near infrared camera. The DSM 51 is installed to have a posture in which the near infrared camera is directed toward a headrest portion of the driver's seat. For example, the DSM 51 may be installed on an upper surface of the steering column portion or an upper surface of the instrument panel. The DSM 51 captures, using the near infrared camera, images of the driver's head which is irradiated by the near infrared light emitted from the near infrared light source. A control unit performs an image analyzing process to the image captured by the near infrared light camera. The control unit provides the extracted information to the autonomous driving ECU 30.

The vehicle control actuator 52 includes a vehicle steering device, a vehicle driving device, and a vehicle braking device. The vehicle steering device controls, for example, a steering angle of front wheels of the vehicle. The vehicle driving device drives, for example, the front wheels of the vehicle 1 by using the power provided from a driving power source of the vehicle 1. The vehicle braking device brakes, for example, the front wheels of the vehicle 1 by a braking method such as friction braking or regenerative braking. The autonomous driving ECU 30 is configured to control the vehicle control actuator 52 by outputting a vehicle control signal to the vehicle control actuator 52.

The operation device 53 is an intention input unit that accepts user operation input by a driver or the like. The operation device 53 mainly includes a device group which includes multiple devices. The operation device 53 includes a driving operation device 53a that enables the driver to execute a driving operation as a driving task in a state where the autonomous driving function is deactivated. The driving operation device 53a may include a steering wheel, an accelerator pedal, a brake pedal, or the like. The steering wheel is configured so that the vehicle steering device can be manually controlled via the autonomous driving ECU 30. The accelerator pedal is configured so that the vehicle drive device can be manually controlled via the autonomous driving ECU 30. The brake pedal is configured so that the vehicle braking device can be manually controlled via the autonomous driving ECU 30.

The operation device 53 further includes a non-driving operation device 53b. The non-driving operation device 53b receives a user operation for activation, deactivation, and setting change of an autonomous driving function, a vehicle navigation function, an air conditioning function, an information presentation function by an information presenting device, and the like. The non-driving operation device for performing these user operations include, for example, a steering switch provided on a spoke portion of the steering wheel, an operation lever provided on a steering column, a touch panel provided on a display device, and a gesture detection device that detects a user gesture as an operation input by the user.

The autonomous driving ECU 30 is used in the vehicle 1, and is mounted on the vehicle 1. By installing the autonomous driving ECU 30, the vehicle 1, that is, the vehicle control unit 40 can perform at least a part of driving tasks instead of the driver. The driving task in the present embodiment includes driving operations such as steering, driving and braking of the vehicle, peripheral monitoring, or the like. The vehicle 1 of the present embodiment is configured to be capable of performing the autonomous driving at level 3 that is specified by the American Society of Automotive Engineers.

The autonomous driving ECU 30 is an electronic control device that performs an autonomous driving function, an advanced driving support function, and the like. The autonomous driving ECU 30 mainly includes a microcomputer equipped with a processor, random access memory (RAM), a storage unit, an input/output interface, and a bus connecting these elements. The autonomous driving ECU 30 has multiple functional units that perform autonomous driving, advanced driving support, and information presentation control by executing a program stored in the storage unit by a processor. The autonomous driving ECU 30 includes a communication unit 31, a vehicle position specifying unit 32, an environment recognition unit 33, a route setting unit 34, a travel locus setting unit 35, a driver behavior confirmation unit 36, an autonomous driving state management unit 37, a vehicle control unit 40, and a driving change information generation unit 38.

The autonomous driving ECU 30 may further include an autonomous driving information DB 39 that is provided by a database stored in the storage unit. The autonomous driving information DB 39 mainly includes a non-volatile memory as a storage medium, and stores data for autonomous driving. The data for autonomous driving includes map data having high-precision map information prepared for autonomous driving (hereinafter, referred to as high-precision map data). The high-precision map data includes three-dimensional shape information of roads including intersections, lane number information, information indicating an allowed travelling direction of each lane, information about pedestrian crossing or bicycle lane, speed limit information, or the like.

The communication unit 31 communicates with an information center provided outside the vehicle 1 by using a wireless communication device or the like capable of performing a wireless communication. As the wireless communication, for example, long-distance communication using a mobile phone line can be adopted. Alternatively, short-distance communication using standards such as Bluetooth (registered trademark) or Wi-Fi (registered trademark) may also be adopted. The information center 3 may be a probe server provided on the cloud. The information center 3 includes a storage unit that stores traffic information, weather information, playback target data which will be described later, in addition to information for updating high-precision map data stored in the autonomous driving information DB 39. The traffic information may include traffic congestion occurrence information and traffic accident occurrence information. The wireless communication device may be configured as a part of the autonomous driving ECU 30, or may be an independent device connected to the communication bus 99 of the in-vehicle network and provided outside of the autonomous driving ECU 30. The communication unit 31 can acquire various information from the information center 3.

The vehicle position specifying unit 32 specifies a latest position and a direction of the vehicle 1. The vehicle position specifying unit 32 specifies the position and direction based on information acquired from the peripheral monitoring sensor 50 and global navigation satellite system (GNSS) receiver. The GNSS receiver receives positioning signals transmitted from multiple artificial satellites (positioning satellites) included in a satellite positioning system, for example, GPS. The GNSS receiver may be configured as a part of the autonomous driving ECU 30, or may be an independent device connected to the communication bus 99 of the in-vehicle network and provided outside of the autonomous driving ECU 30.

The environment recognition unit 33 recognizes a surrounding environment of the vehicle 1. This recognition is based on the position and direction information specified by the vehicle position specifying unit 32, the information output from the peripheral monitoring sensor 50, and the information acquired from the autonomous driving information DB 39.

The route setting unit 34 sets a route to a destination set in the autonomous driving function and vehicle navigation function based on the position specified by the vehicle position specifying unit 32 and the information acquired from the autonomous driving information DB 39.

The travel locus setting unit 35 sets a travel locus along which the vehicle plans to travel by the autonomous driving function based on the position and direction information specified by the vehicle position specifying unit 32, the information about the surrounding environment recognized by the environment recognition unit 33, or the like. Specifically, the travel locus setting unit 35 sets a travel locus of a lane in which the vehicle plans to travel among multiple lanes of the current travelling road of the vehicle 1 and sets a travel locus of lane change when the vehicle changes lanes. Herein, the current travelling road of the vehicle 1 is included in the route set by the route setting unit 34.

The driver behavior confirmation unit 36 confirms the driver's behavior. The driver's behavior includes behavior information about the driver's head movement and line-of-sight movement. The driver's head movement and line-of-sight movement may be acquired from the DSM 51. The driver's behavior includes user operation information which is input by the driver using the operation device 53. Among the user operations confirmed by the driver behavior confirmation unit 36, information on user operation related to the content playback function is provided to the HCU 100.

The autonomous driving state management unit 37 manages a state of the autonomous driving based on information on the position and direction of the vehicle 1 specified by the vehicle position specifying unit 32, information on the surrounding environment recognized by the environment recognition unit 33, traffic information and weather information acquired by the communication unit 31, activation information of the autonomous driving function set by the non-driving operation device 53b, the user operation information input to the driving operation device 53a, and the like. In the present embodiment, the autonomous driving state management unit 37 manages the autonomous driving level as a vehicle control state, and switches the autonomous driving level in a timely manner. In the present embodiment, the autonomous driving level is defined to have a discrete integer numerical value within a range from 0 to 3. The autonomous driving level is set so that higher numerical value indicates that an execution authority of the driving task by the vehicle control unit 40 has a broader range.

For example, when the autonomous driving level is level 0, the driver has the authority to execute all of the driving tasks. When the autonomous driving level is level 1, the vehicle control unit 40 executes one of the vehicle steering, the vehicle driving, or the vehicle braking among the driving tasks, and the driver executes all of the remaining driving tasks. When the autonomous driving level is level 2, the vehicle control unit executes the vehicle steering, the vehicle driving, and vehicle braking, and the driver needs to monitor the operation state of the driving task executed by the vehicle control unit 40. In level 2, the driver needs to maintain a state in which the driver can immediately operate the driving operation device 53a instead of the vehicle control unit 40 by maintaining a state of holding the steering wheel or the like. The functions executed at level 1 and level 2 are partial substitute function for the driving task. Thus, the functions corresponding to level 1 and level 2 may correspond to an advanced driving support function.

When the autonomous driving level is level 3, the vehicle control unit 40 has the authority to execute all of the driving tasks of vehicle steering, vehicle driving, vehicle braking, and peripheral monitoring. In this case, the vehicle control unit 40 executes all of these driving tasks. At this time, the driver can perform a second task described later without monitoring the state of the driving task executed by the vehicle control unit 40 and also without holding the steering wheel. However, a driving change may occur when the autonomous driving level is switched from level 3 to level 2 or lower, that is, the execution authority of the driving task is changed from the vehicle control unit 40 to the driver.

The autonomous driving state management unit 37 determines to switch the autonomous driving level from level 3 to level 2 or lower when the functional limit of the autonomous driving function is reached or when the functional limit is predicted to be reached. Reaching the functional limit may include a difficulty occurrence in continuation of the autonomous driving function, such as an occurrence of unexpected event in the surrounding environment which is out of an predictable range of the vehicle control unit 40, a malfunction of the peripheral monitoring sensor 50 due to bad weather, or the like.

The autonomous driving state management unit 37 determines to switch the autonomous driving level from level 3 to level 2 or lower when an predicted entrance into a restricted area where the autonomous driving function is restricted. Examples of entrance into the restricted area include entrance into a general road that is defined as a restricted area from a highway that is defined as an unrestricted area.

The autonomous driving state management unit 37 determines to switch the autonomous driving level from level 3 to level 2 or lower in response to the setting of the autonomous driving function is changed by the driver. With the determination to switch the level from level 3 to level 2 or lower in response to one trigger described above, the autonomous driving state management unit 37 determines a driving change section within which the driving change should be carried out. The driving change section may be a section defined by a time slot or a physical area defined on the road. An end point of the driving change section may be set to a time point at which the execution of the autonomous driving function is predicted to be difficult to continue, or may be set to a time point at which the vehicle is scheduled to enter the restricted area. The end point of the driving change section may also be set to a position where the execution of the autonomous driving function is predicted to be difficult to continue. The end point of the driving change section may also be set to a position where the execution of the autonomous driving function is predicted to be difficult to continue, or may be set to a position where the vehicle is scheduled to enter the restricted area.

The vehicle control unit 40 controls the vehicle control actuator 52 based on the autonomous driving level managed by the autonomous driving state management unit 37. When the autonomous driving level is level 0, the vehicle control unit 40 acquires user operation information input from the driving operation device 53a to the autonomous driving ECU 30 through the driver behavior confirmation unit 36. The vehicle control unit 40 controls the vehicle control actuator 52 so that the vehicle control actuator 52 operates at an operation amount and an operation time corresponding to the user operation. The driver operating the driving operation device 53a is in a state of having a substantial authority to execute the driving task.

When the autonomous driving level is level 3, the vehicle control unit 40 calculates the operation amount of the vehicle control actuator 52 for driving the vehicle 1 along the travel locus determined by the travel locus setting unit 35, and controls the vehicle control actuator 52 to execute the calculated operation amount. That is, the vehicle control unit 40 has the authority to execute the driving task.

When the autonomous driving level is level 1 or level 2, intermediate control between the above-mentioned control in level 0 and the control in level 3 is carried out. In one example, a control equivalent to the control in level 0 is applied to some devices of the vehicle control actuator 52, and a control equivalent to the control in level 3 is applied to other devices of the vehicle control actuator 52. In another example, during a state where a control equivalent to the control in level 0 is applied, the vehicle control unit 40 may intervene in execution of the driving task in response to determining that the driving task executed by the driver is not appropriate with consideration of the surrounding environment.

When the autonomous driving state management unit 37 determines to switch the autonomous driving level from level 3 to level 2 or lower, the vehicle control unit 40 continues the control of level 3 and waits for an input of user operation indicating an intention of driving change so that the user performs the driving task. Examples of the user operation indicating the intention of driving change so that the user performs the driving task include a contact on the driving operation device 53*a* such as the steering wheel or a driving operation applied to the driving operation device 53*a* such as the steering wheel. When such a user operation is acquired as information from the driver behavior confirmation unit 36, the autonomous driving state management unit 37 actually switches the autonomous driving level from level 3 to level 2 or lower, and the vehicle control unit 40 starts a control corresponding to level 2 or lower. In this way, the driving change is carried out.

The driving change information generation unit 38 cooperates with the autonomous driving state management unit 37 to generate the driving change information to be presented by the information presentation device 20. When the autonomous driving state management unit 37 determines to switch the autonomous driving level from level 3 to level 2 or lower, that is, determines to change the driving subject, the driving change information generation unit 38 generates the driving change information.

The driving change information generation unit 38 calculates a margin to the driving change, for example, based on the driving change section determined by the autonomous driving state management unit 37. The margin is a value set based on the remaining amount to the end point of the driving change section. For example, the remaining amount corresponds to a remaining period to an end time point of the driving change section or a remaining distance to an end position of the driving change section.

The driving change information generation unit 38 selects and generates, based on the margin, the driving change information required to be notified to the driver. For example, when the margin is larger than a predetermined value α, the driving change information generation unit 38 generates information recommending the driving change (hereinafter referred to as driving change recommendation information) as the driving change information. When the margin is equal to or less than the predetermined value α and larger than a predetermined value β, the driving change information generation unit 38 generates information proposing the driving change (hereinafter referred to as driving change proposing information) as the driving change information. When the margin is equal to or less than the predetermined value β, the driving change information generation unit 38 generates information for warning the driving change (hereinafter referred to as driving change warning information) as the driving change information. Herein, predetermined value α and predetermined value satisfy a relationship α>β.

When the driving change is executed, the driving change information generation unit 38 generates information indicating that the driving change has been carried out (hereinafter referred to as driving change execution information).

The driving change information generation unit 38 calculates a driving load of the driver predicted after the driving change is carried out as information related to driving change. The driving load is calculated based on the driving environment predicted after the driving change is carried out.

The traveling environment includes at least one of shape of the road on which the vehicle 1 travels, the number of other vehicles and the like existing around the vehicle 1, and the weather. The road shape may be acquired from the information provided by the high-precision map data and the surrounding environment recognized by the environment recognition unit 33. The driving change information generation unit 38 calculates a level of the change in the road shape in front of the vehicle 1. When the road in front of the vehicle 1 has a straight linear shape that continues for a while, the change level of the road shape is considered to be small. When the road in front of the vehicle 1 has a shape in which a curve exists, a shape in which the number of lanes increases or decreases, a shape in which a junction, a branch or an intersection exists, the change level of the road shape is considered to be large. The driving change information generation unit 38 calculates the driving load such that the driving load increases with an increase of the change level of the road shape.

The number of other vehicles and the like existing around the vehicle 1 is acquired from the surrounding environment recognized by the environment recognition unit 33. The driving change information generation unit 38 calculates the driving load such that the driving load increases with an increase of the number of other vehicles, pedestrians, etc. existing around the vehicle 1.

The weather information is obtained from the information center 3. The driving change information generation unit 38 calculates the driving load such that the driving load increases with the weather becomes worse.

The driving change information generation unit 38 provides the generated driving change information and the driving load information to the HCU 100 so that the information is presented by the information presentation device 20.

The following will describe details of the information presentation device 20 and the HCU 100 included in the information presentation system.

The information presentation device 20 presents information to the driver. The information presentation device 20 includes a display 21 and a speaker 22. The display 21 is arranged, for example, on an instrument panel. The display 21 mainly includes a display device group, and the display device group includes multiple configurations such as a meter information display (MID), a head up display (HUD), and a multiple center information displays (CID). These display 21 can display an image on a screen 21*a*.

The speaker 22 may be arranged in the vicinity of the screen of the display on the instrument panel, on a door panel of the vehicle, on a rear quarter panel of the vehicle, or the like. The speaker 22 can output a sound by converting an input electric signal to a physical signal using a voice coil and a vibrating plate. The speaker 22 may be provided as one or more speaker elements which are commonly used by entire elements of the display 21. Alternatively, he speaker 22 may be configured such that each speaker element corresponds to each element of the display 21.

The HCU 100 is an electronic control device that integrally controls information presentation executed by the display 21 and the speaker 22 in the information presentation system. As shown in FIG. 1, the HCU 100 mainly includes a computer equipped with a processor 11, a RAM 12, a storage unit 13, an input/output interface 14, and a bus connecting these elements. The processor 11 is a hardware combined with the RAM 12, and executes arithmetic processing. The processor 11 includes at least one calculation core, such as a central processing unit (CPU) or a graphics processing unit (GPU). The processor 11 may further include a field-programmable gate array (FPGA) and an IP core having other dedicated functions. The RAM 12 may include a video RAM for generating a video. The processor 11 accesses the RAM 12 to execute various processes for providing the functions of the respective functional blocks. The storage unit 13 includes a non-volatile storage medium. The storage unit 13 stores various programs (for example, an information presentation control program) to be executed by the processor 11, playback target data of the playback content to be played back by the information presentation device 20, and the like.

The HCU 100 has multiple functional blocks for presenting information to the driver by executing the information presentation control program stored in the storage unit 13 by the processor 11. Specifically, the HCU 100 has an information acquisition unit 15 and an information presentation control unit 16.

The information acquisition unit 15 acquires the driving change information based on a signal input from the autonomous driving ECU 30 via the communication bus 99. After the driving change is determined, the driving change information acquired within the driving change section until a completion of the driving change may include one of the driving change recommendation information, the driving change proposing information, or the driving change warning information which should be presented at a current time. Since these pieces of information are selected based on the margin, the driving change information substantially includes the margin information. Therefore, the information acquisition unit 15 obtains the margin information by acquiring the driving change information.

The information acquisition unit 15 may appropriately acquire information about the driving load in addition to the driving change information which is provided by the driving change information generation unit. The information acquisition unit 15 may appropriately acquire information for performing the information presentation control from the autonomous driving ECU 30 or the like. The information for performing the information presentation control may include information indicating a state of the vehicle such as vehicle speed, map information based on high-precision map data, route information set by the route setting unit 34, information about travel locus set by the travel locus setting unit 35, or the like.

The information acquisition unit 15 obtains, via the driver behavior confirmation unit 36, information on the user operation related to the content playback function among the user operations input to the non-driving operation device 53*b* based on the signal input from the autonomous operation ECU 30 via the communication bus 99. The information acquisition unit 15 obtains the information by acquiring the information of the user operation related to the content playback function. The information acquisition unit 15 successively provides various information, which is acquired, to the information presentation control unit 16.

The information presentation control unit 16 controls the presentation of information to the driver by generating image data to be successively output to the display 21 and audio data to be successively output to the speaker 22. The information presentation control unit 16 has a driving change information presentation function and a playback mode control function in order to control the information presentation to the driver.

Figure 3:
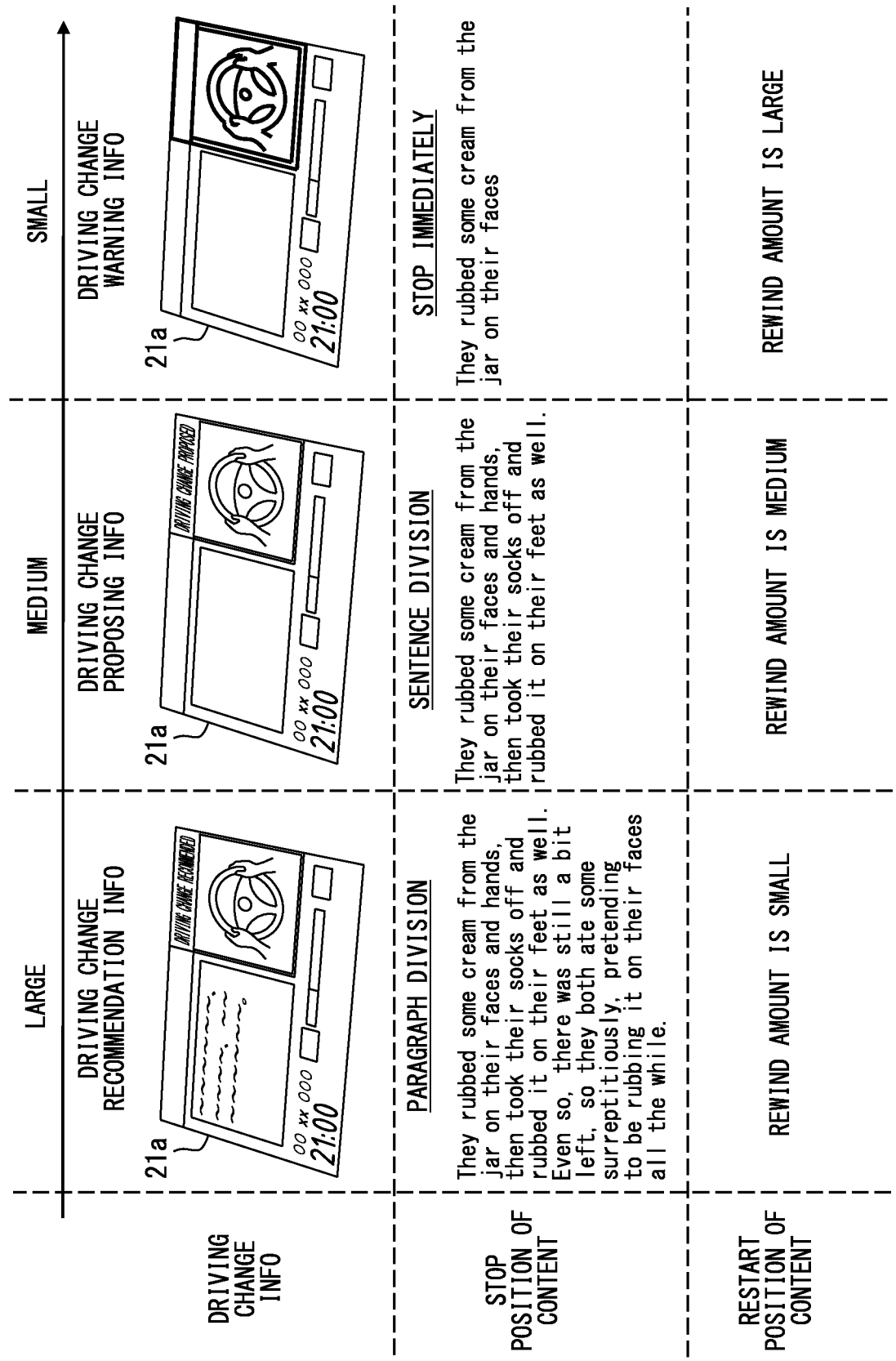
FIG. 3 is a diagram schematically showing a relationship among driving change information, a stop point, a restart point, and a margin according to the first embodiment.

The driving change information presentation function presents driving change information. When the information acquisition unit 15 acquires the driving change information, the information presentation control unit 16 displays driving change information content indicating the driving change information on a predetermined screen 21*a* of the display 21 (see FIG. 3). When the type of driving change information is changed by the driving change information generation unit 38 according to the decrease in the margin with the elapse of time, the information presentation control unit 16 changes the type of driving change information presented by the driving change information content. When the driving change is carried out, the information presentation control unit 16 ends the display of the driving change information content.

When the autonomous driving state management unit 37 determines to switch the autonomous driving level from level 3 to level 2 or less and the margin is already β or less than β, the driving warning information may be displayed as the driving change information content without displaying the driving change recommendation information and the driving change proposing information.

The playback mode control function controls the playback mode of the content in order to perform the content playback function on the information presentation device 20. The playback content is content that can be presented to the driver by the information presenting device 20 playing back the playback target data. Examples of the type of playback content include audio books, moving images such as movies, and music. These playback contents are used for the second task performed by the driver when the autonomous driving level is level 3. Here, the second task is a secondary task indicating a task other than driving while the driving task is a primary task. The second task is also referred to as a secondary activity.

The playback target data may be data that is non-temporarily included in the storage medium of the storage unit 13. Further, the playback target data may be data that has been downloaded from the information center 3 via the communication unit 31 by a streaming method and temporarily included in the storage unit 13.

The playback target data includes time-series data in which one or both of the image data and the audio data are associated with the playback time (which can also be referred to as a playback position). In the present embodiment, the playback target data includes division data which indicates one or more division positions PP1, PP2 for dividing the time series data before and after a specific playback position. The playback target data includes the division data in a correlated manner with the time series data.

The division data may be added to the time series data in advance when the playback data to be played back is included in the storage medium or the playback data is downloaded. Alternatively, the information presentation control unit 16 may be configured to add the division data to the playback target data when the playback target data does not include the division data. In this configuration, the content of the playback target data is analyzed by executing a division position setting program stored in the storage unit 13 so that multiple partition positions PP1, PP2 are set in the playback target data. An analysis algorithm based on a neural network may be adopted for the analysis of the playback target data.

When the autonomous driving level is level 3, the information presentation control unit 16 plays back the content based on the information indicating the user operation related to the content playback function. That is, when an operation for starting the playback of the content is input by the user operation, the information presentation control unit 16 starts the playback of the content using the display and the speaker. When an operation for stopping the playback of the content is input by the user operation made on the non-driving operation device 53*b*, the information presentation control unit 16 stops the playback of the content.

When a determination is made to switch the automatic driving level to level 2 or lower from the level 3 in a state where the playback content is being played back, the information presentation control unit 16 starts the presentation of the driving change information based on the driving change information presentation function. Then, when the information presentation control unit 16 acquires the driving change execution information from the information acquisition unit 15, the information presentation control unit 16 confirms a time when the driving change is executed and a type of the driving change information immediately before the time when the driving change is executed. Since the type of driving change information is correlated to the margin, the information presentation control unit 16 substantially confirms the margin at the time when the driving change is executed.

The information presentation control unit 16 stops the playback of the content in accordance with the driving change. The stop of playback is not triggered by a direct user operation input to the non-driving operation device 53 related to the content playback function. The playback stop position SP of the content is determined according to the type of driving change information immediately before the time, that is, according to the margin. In a case where the margin is large, the stop position SP is determined to be a later position on the playback time compared with a case where the margin is relatively small.

In a case where the driving change information immediately before the execution of the driving change is the driving change recommendation information, the stop position SP is set to a later position compared with a case where the driving change information immediately before the execution of the driving change is the driving change proposing information or the driving change warning information. In a case where the driving change information immediately before the execution of the driving change is the driving change proposing information, the stop position SP is set to a later position compared with a case where the driving change information immediately before the execution of the driving change is the driving change warning information.

The driver can restart the playback of the stopped content after execution of the driving change, for example, after the autonomous driving level returns to level 3 again. When the autonomous driving level is level 3, the information presentation control unit 16 plays back the content based on the information indicating the user operation related to the content playback function. That is, when an operation for restarting the playback of the content is input by the user operation, the information presentation control unit 16 starts the playback of the content using the display 21 and the speaker 22 again.

In this restart, when the driving load calculated by the driving change information generation unit 38 is larger than a predetermined value γ, the restart position CP of playback content is set to a time before the stop position SP and the content is rewound before restarting the playback. The restart position CP is determined based on the type of driving change information immediately before the time when the driving change is performed according to the margin. In a case where the margin is relatively small, the restart position CP is determined to be a position before a restart position set in a case where the margin is large.

In a case where the driving change information immediately before the execution of the driving change is the driving change warning information, the restart position CP is set to a previous position compared with a case where the driving change information immediately before the execution of the driving change is the driving change proposing information or the driving change recommendation information. In a case where the driving change information immediately before the execution of the driving change is the driving change proposing information, the restart position CP is set to a previous position compared with a case where the driving change information immediately before the execution of the driving change is the driving change recommendation information.

When the driving load is equal to or less than the predetermined value γ, the information presentation control unit 16 matches the restart position CP with the stop position SP without performing rewinding the content from the stop position SP to the restart position CP.

The following will describe a case where the playback content is an audio book in detail with reference to FIG. 3 to FIG. 7. The audio book in the present embodiment is a multimedia content which plays back a text or a writing, for example, a story in audio manner by outputting a voice from a speaker, and the text output in audio manner is displayed on the screen 21a of the display 21.

The playback target data of the audiobook includes the above-described time series data and division data. As the division position defined by the division data, multiple levels of division positions including, for example, paragraph division positions PP1 and text division positions PP2 may be set according to the structure of the text. Specifically, as the specific playback time described above, the paragraph division position PP1 is set at a time corresponding to the position where one paragraph of the text starts. The sentence division position PP2 is set at a time corresponding to the position where one sentence starts. The paragraph division position PP1 functions as a general division than the sentence division position PP2, and the sentence division position PP2 functions as a detailed division than the paragraph division position PP1. For example, as shown in FIG. 4 to FIG. 6, when one paragraph is composed of five sentences, four sentence division positions PP2 are set between adjacent two paragraph division positions PP1.

Figure 4:
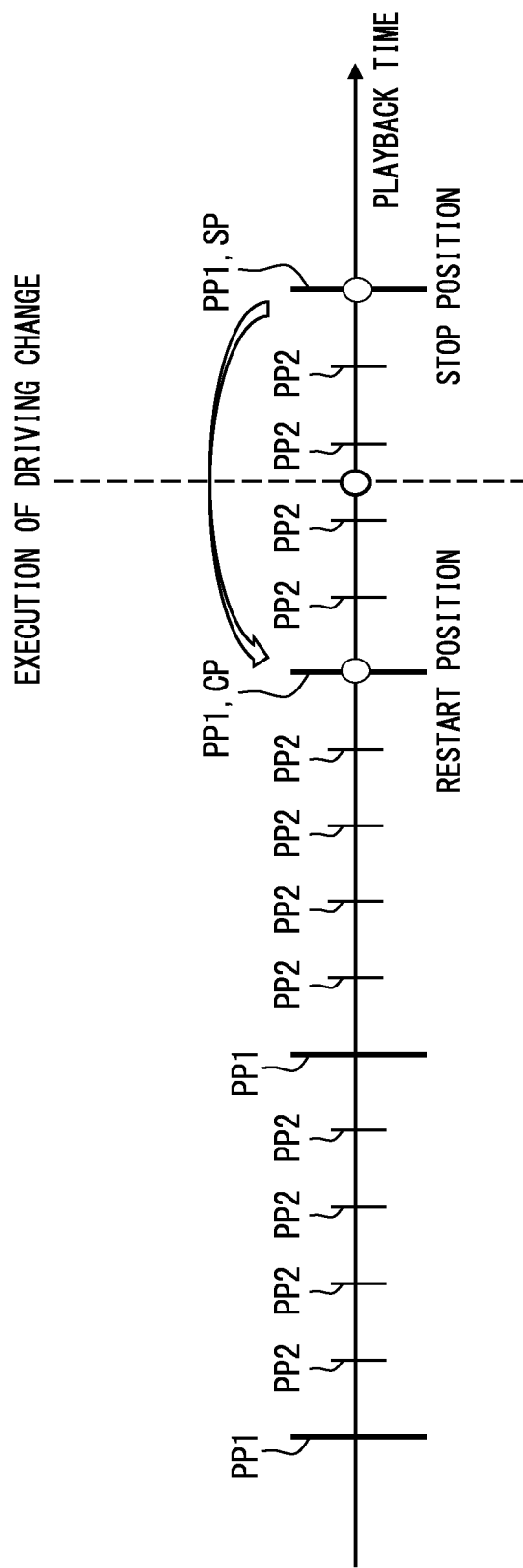
FIG. 4 is a diagram showing an example of a stop point and a restart point in a control pattern A of the first embodiment.

When the driving change information immediately before the execution of the driving change is the driving change recommendation information, the playback mode of the content is controlled according to a control pattern A as shown in FIG. 4. Specifically, the information presentation control unit 16 sets, as the stop position SP, the paragraph division position PP1 immediately after the playback time corresponding to the execution of driving change. Therefore, when the playback of the content is to be stopped in response to driving change, the playback is continued until the reading of current paragraph of the text is completed even though the driving change is executed. Further, the screen 21a of display 21 also displays the current paragraph of the text being read while the audio playback of the content is being continued.

The information presentation control unit 16 sets, as the restart position CP, the paragraph division position PP1 immediately previous to the playback time corresponding to the execution of driving change. Therefore, when the playback of the content is restarted, the content is rewound by an amount of one paragraph, and then playback is restarted.

Figure 5:
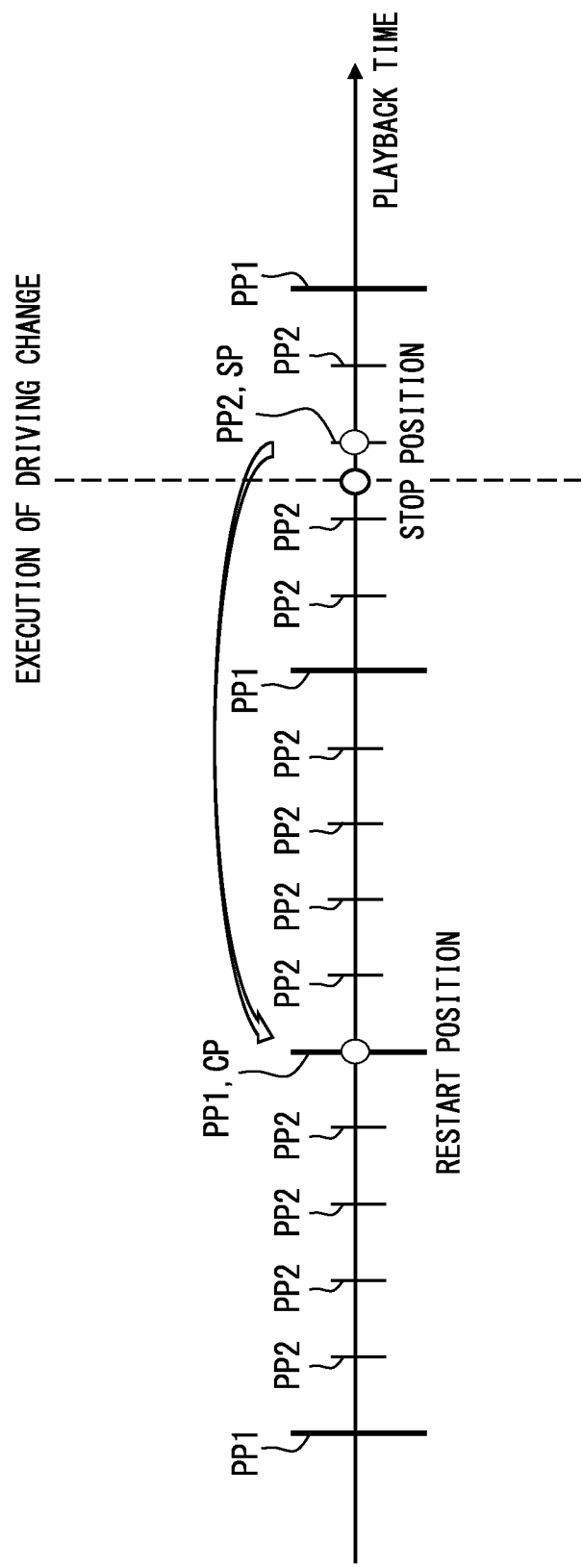
FIG. 5 is a diagram showing an example of a stop point and a restart point in a control pattern B of the first embodiment.
Figure 6:
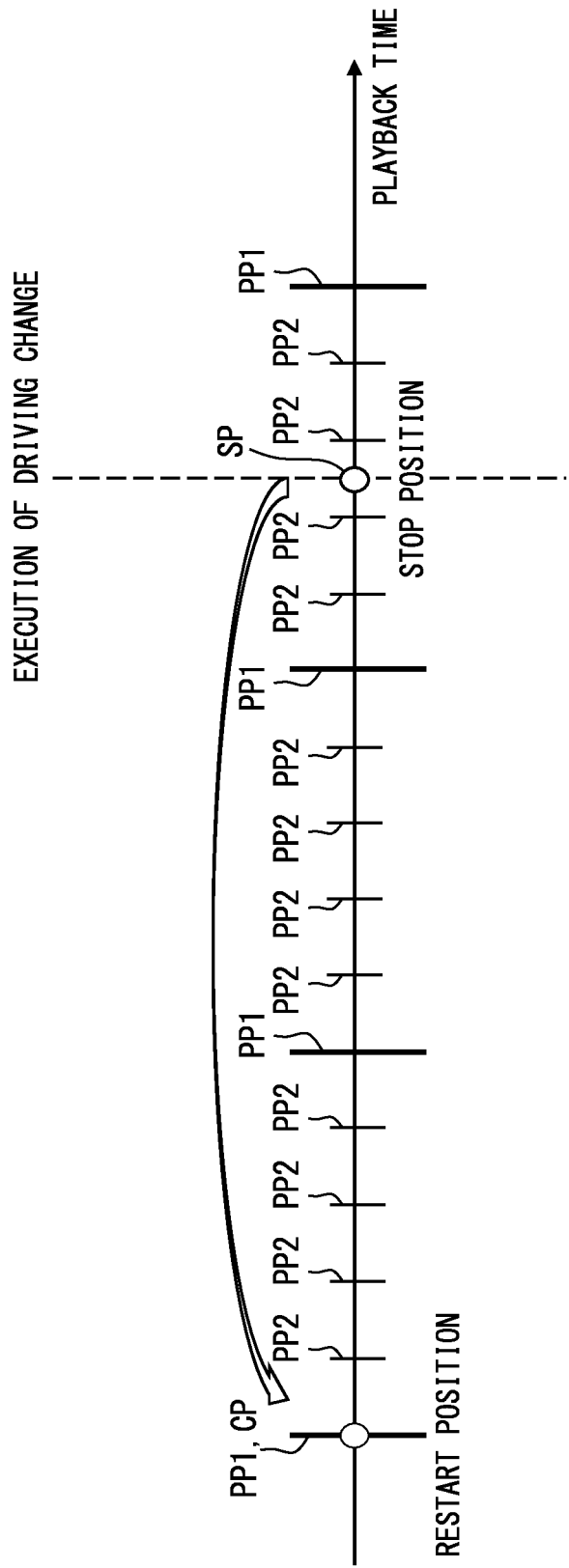
FIG. 6 is a diagram showing an example of a stop point and a restart point in a control pattern C of the first embodiment.

When the driving change information immediately before the execution of the driving change is the driving change proposing information, the playback mode of the content is controlled according to a control pattern B as shown in FIG. 5. Specifically, the information presentation control unit 16 sets, as the stop position SP, the sentence division position PP2 immediately after the playback time corresponding to the execution of driving change. Therefore, when the playback of the content is to be stopped in response to driving change, the playback is continued until the reading of current sentence of the text is completed even though the driving change is executed. The sentence being played back is not displayed on the screen 21a of the display 21 while the playback in audio manner is continued.

The information presentation control unit 16 sets, as the restart position CP, the paragraph division position PP1 previous to the playback time corresponding to the execution of driving change by two paragraph division positions ago. Therefore, when the playback of content is restarted, the content is played back after one total paragraph previous to the current paragraph and a part of the current paragraph are rewound. The current paragraph is stopped in the middle corresponding to the driving change.

When the driving change information immediately before the execution of the driving change is the driving change warning information, the playback mode of the content is controlled according to a control pattern C as shown in FIG. 6. Specifically, the information presentation control unit 16 sets the stop position SP immediately after the execution of driving change. Therefore, when the driving change is executed, the playback of content is stopped immediately after the execution of driving change. The display of sentence being played back in audio manner on the screen 21a of the display 21 is also immediately deactivated.

The information presentation control unit 16 sets, as the restart position CP, the paragraph division position PP1 previous to the playback time corresponding to the execution of driving change by three paragraph division positions ago. Therefore, when the playback of content is restarted, the content is played back after two total paragraph previous to the current paragraph and a part of the current paragraph are rewound. The current paragraph is stopped in the middle corresponding to the driving change.

Figure 7:
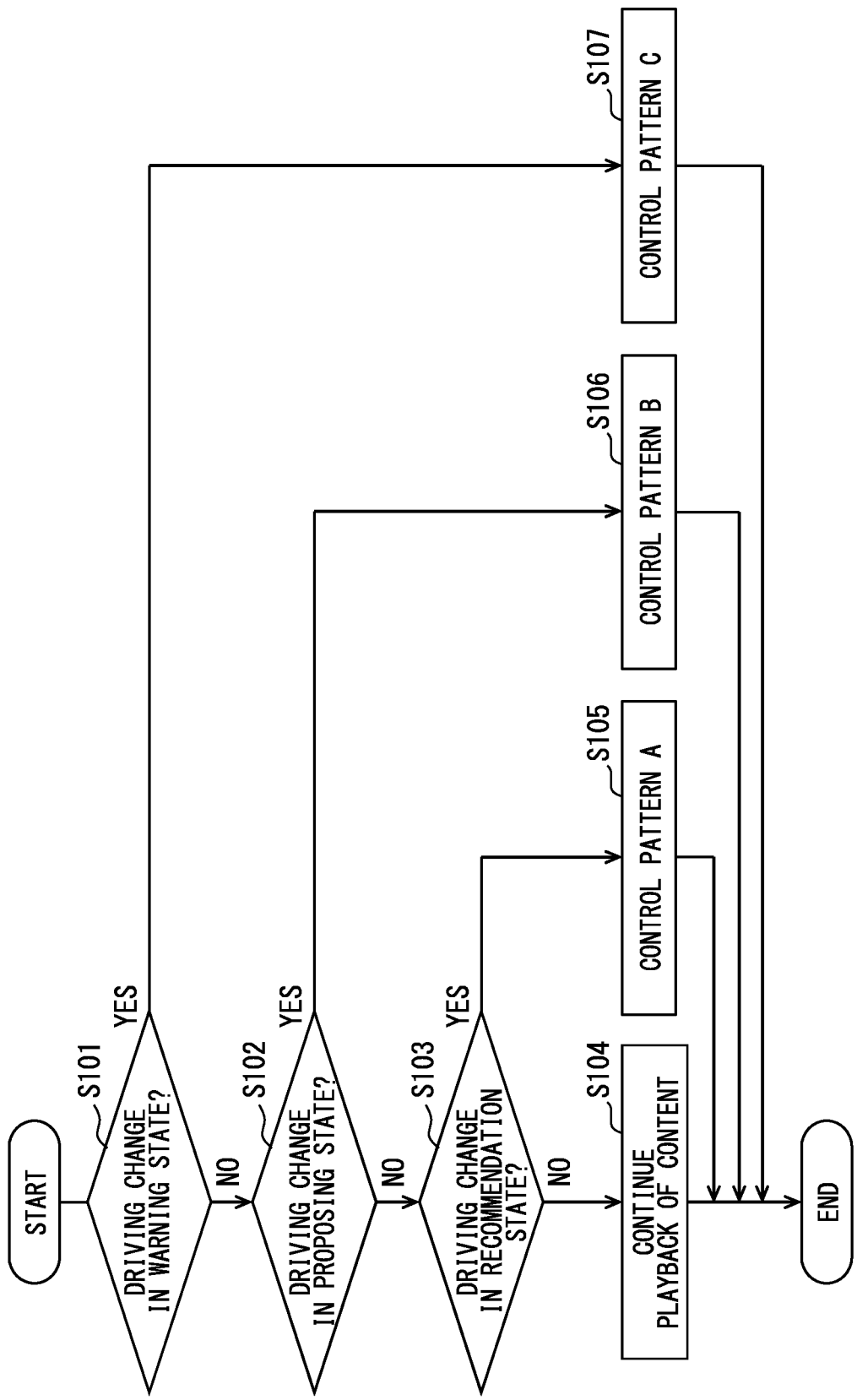
FIG. 7 is a flowchart showing an information presentation control process executed by the HCU according to the first embodiment.

The following will describe a method of controlling the playback mode of the content by executing information presentation control program stored in the storage unit 13 using the processing unit 11 with reference to the flowchart shown in FIG. 7. A series of processes included in the flowchart are repeatedly executed at an appropriate start time in a state where the autonomous driving level is level 3 and the content is being played back.

In S101, the information presentation control unit 16 determines whether the driving change is performed in a state where the driving change information is the driving change warning information. In response to an affirmative determination in S101, the process proceeds to S107. In response to a negative determination in S101, the process proceeds to S102.

In S102, the information presentation control unit 16 determines whether the driving change is performed in a state where the driving change information is the driving change proposing information. In response to an affirmative determination in S102, the process proceeds to S106. In response to a negative determination in S102, the process proceeds to S103.

In S103, the information presentation control unit 16 determines whether the driving change is performed in a state where the driving change information is the driving change recommendation information. In response to an affirmative determination in S103, the process proceeds to S105. In response to a negative determination in S103, the process proceeds to S104.

In S104, the information presentation control unit 16 determines that the driving change is not performed, and continues the playback of content. After S104, the process is ended.

In S105, the information presentation control unit 16 controls the playback mode of content in the control pattern A described above. After S105, the process is ended.

In S106, the information presentation control unit 16 controls the playback mode of content in the control pattern B described above. After S106, the process is ended.

In S107, the information presentation control unit 16 controls the playback mode of content in the control pattern C described above. After S107, the process is ended.

In the present embodiment, the HCU 100 corresponds to the information presentation control device that controls the information presentation device. The information acquisition unit 15 corresponds to a margin obtaining unit that obtains the margin related to the driver before the driving change. The information presentation control unit 16 corresponds to a playback mode control unit that controls the playback mode of the content.

The following will describe advantages according to the above-described first embodiment.

According to the first embodiment, the playback of content is stopped at the stop position SP in response to the driving change, and then the content is rewound from the stop position SP by predetermined amount and then the playback of content is restarted from the restart position CP. By the rewinding of content, the temporarily overlooked part of displayed content or temporarily missed part of audio content can be played back again. Then, the restart position CP at which the playback is restarted is determined according to the driver's margin before the driving change. Since the playback position is set according to the margin of the driver, the playback part can be optimized with consideration of the visually overlooked part or audibly missed part. Thus, with the above-described configuration, the driver can smoothly recognize the content in a case where the driving change is performed.

According to the first embodiment, the restart position CP in a case where the margin is relatively small is set to be earlier than the restart position CP in a case where the margin is relatively large. For example, in a state where the margin is small, overlook of displayed content or missing of audio content are likely to occur. For avoiding the missing or overlook, the rewound part of content is set to be longer compared with a state where the margin is large. With this configuration, the driver can check the overlooked display content or missed audio content again, and the playback content can be smoothly recognized.

According to the first embodiment, the amount of rewound part from the stop position to the restart position is set to be increase with a decrease of the margin. That is, with a possibility that the overlooked or missed portion are likely to occur increases, a rewinding length of the playback content is set to be increased. With this configuration, the driver can check the overlooked display content or missed audio content again, and the playback content can be smoothly recognized.

According to the first embodiment, whether to rewind the content from the stop position SP to the restart position CP in response to the driving change is determined according to the driver's driving load. For example, when the driving load is small and the possibility of overlook of display content or missing of audio content is low, it is possible to prevent the same content part from being played back again. Thus, the annoyance felt by the driver can be reduced.

According to the first embodiment, the playback of content is stopped at the stop position SP in response to the driving change. Then, the stop position SP at which the playback is stopped is determined according to the driver's margin before the driving change. By playing back the content as much as possible according to the driver's margin and stopping at an appropriate stop position SP, it is possible to suppress overlook of displayed content or missing of audio content from being occurred. Thus, with the above-described configuration, the driver can smoothly recognize the content in a case where the driving change is performed.

According to the first embodiment, the stop position SP in a case where the margin is relatively large is set to be later than the stop position SP in a case where the margin is relatively small. For example, the content can be played back to a position where it is easy to understand with good division in a state where the margin is relatively large and overlook of displayed content or missing of audio content is less likely to occur. Thus, the driver can smoothly recognize the content in a case where the driving change is performed.

Second Embodiment

Figure 8:
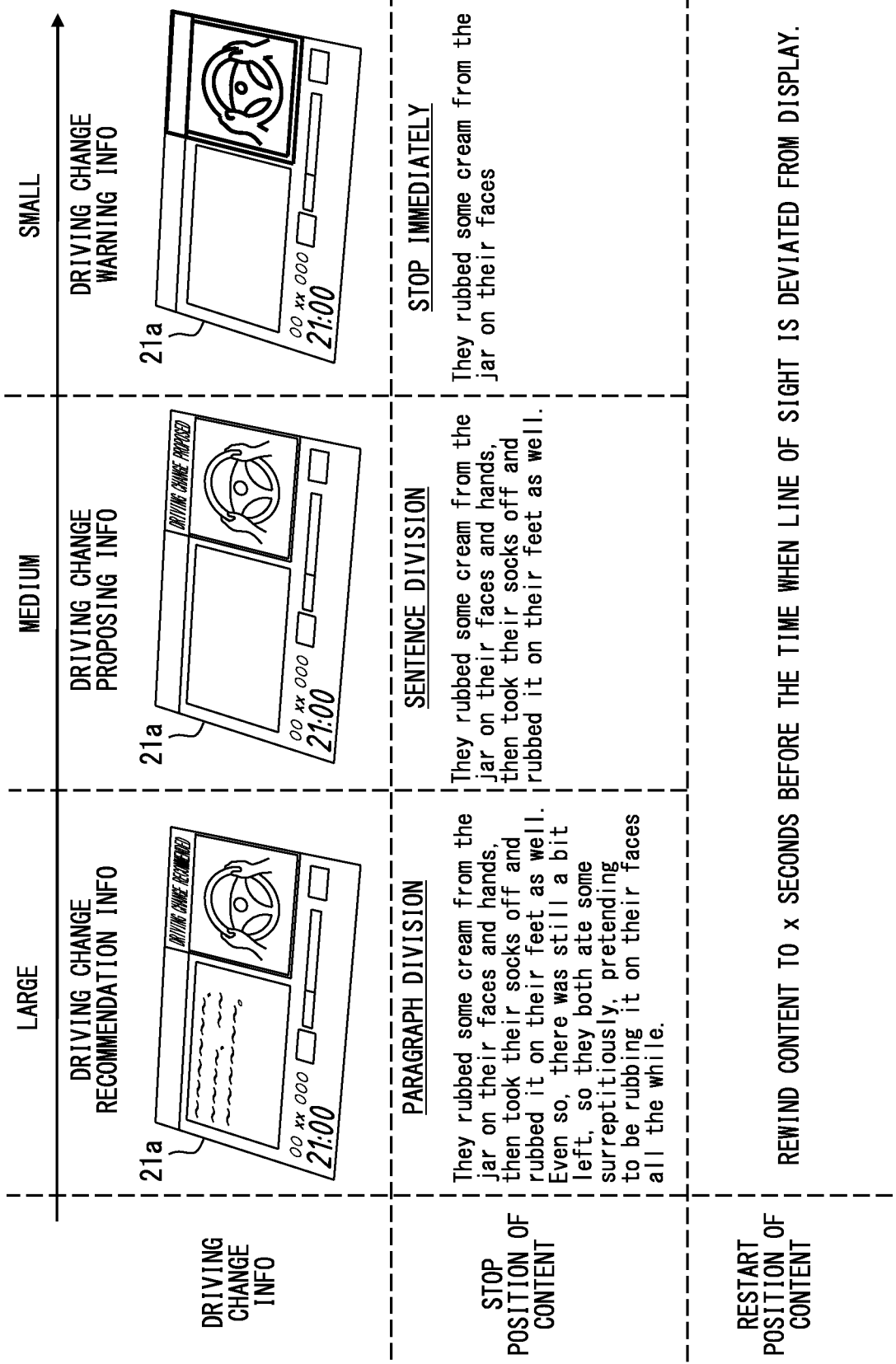
FIG. 8 is a diagram schematically showing a relationship among driving change information, a stop point, a restart point, and a margin according to a second embodiment.
Figure 9:
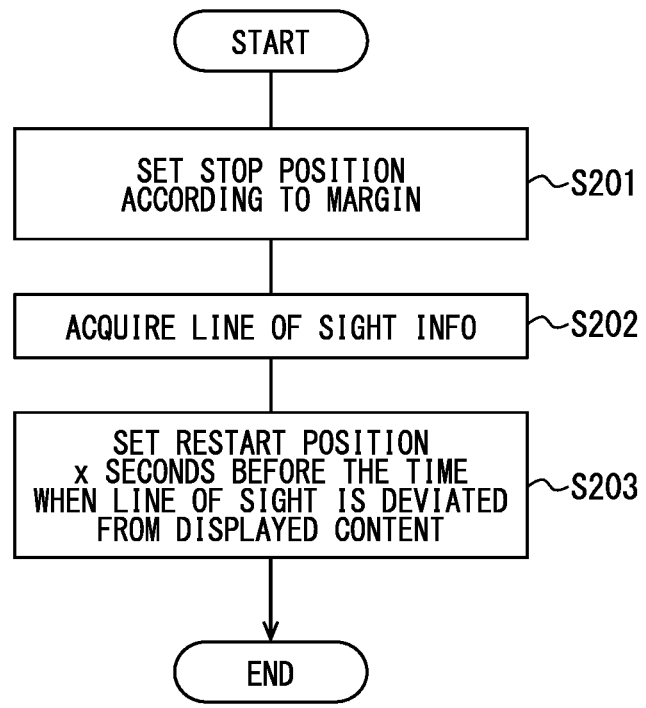
FIG. 9 is a flowchart showing an information presentation control process executed by a HCU according to the second embodiment.

As shown in FIG. 8 and FIG. 9, the second embodiment is a modification of the first embodiment. The second embodiment will be described focusing on differences from the first embodiment.

Instead of acquiring the driving load information, the information acquisition unit 15 in the second embodiment acquires information indicating a movement of the driver's line of sight confirmed by the driver behavior confirmation unit 36. The information indicating movement of the line of sight includes information indicating whether the line of sight of the driver is currently directed toward the screen 21a of the display 21 which displays the content, and information indicating a time when the line of sight of the driver deviates from the screen 21a in a case where the line of sign of the driver is not directed toward the screen. The information acquisition unit 15 successively provides information indicating movement of driver's line of sight to the information presentation control unit 16.

The information presentation control unit 16 in the second embodiment determines the stop position SP according to the margin similar to the first embodiment. The information presentation control unit 16 determines the restart position CP by a process which is different from that of the first embodiment. The restart position CP is determined according to the time when the driver's line of sight deviates from the screen 21a that displays the content.

Specifically, as shown in FIG. 8, the information presentation control unit 16 sets the restart position CP so that the restart position is x seconds before the time when the driver's line of sight deviates from the screen 21a that displays the content. The value of x may be set, for example, within a range from 0 to 10. In the present embodiment, the value of x is set to 3 seconds.

The following will describe a method of controlling the playback mode of the content, especially, a method of determining the stop position SP and the restart position CP by executing information presentation control program stored in the storage unit 13 using the processing unit 11 with reference to the flowchart shown in FIG. 9. A series of processes included in the flowchart are repeatedly executed at an appropriate start time in a state where the autonomous driving level is level 3 and the content is being played back.

In S201, the information presentation control unit 16 sets the stop position SP according to the margin. After the process in S201, the process proceeds to S202.

In S202, the information acquisition unit 15 acquires the line-of-sight information from the autonomous driving ECU 30, and provides the acquired information to the information presentation control unit 16. After the process in S202, the process proceeds to S203.

In S203, the information presentation control unit 16 sets the restart position CP so that the restart position is x seconds before the time when the driver's line of sight deviates from the screen 21a that displays the content. After S203, the process is ended.

As described above, in the second embodiment, the restart position CP is determined according to the time when the driver's line of sight deviates from the screen 21a that displays the content. The restart position CP is set with consideration of the part of content which may be not viewed by the driver. Thus, with the configuration of the second embodiment, the driver can smoothly recognize the content in a case where the driving change is performed.

Other Embodiments

Although multiple embodiments have been described above, the present disclosure is not construed as being limited to those embodiments, and can be applied to various embodiments and combinations within a scope that does not depart from the spirit of the present disclosure.

Figure 10:
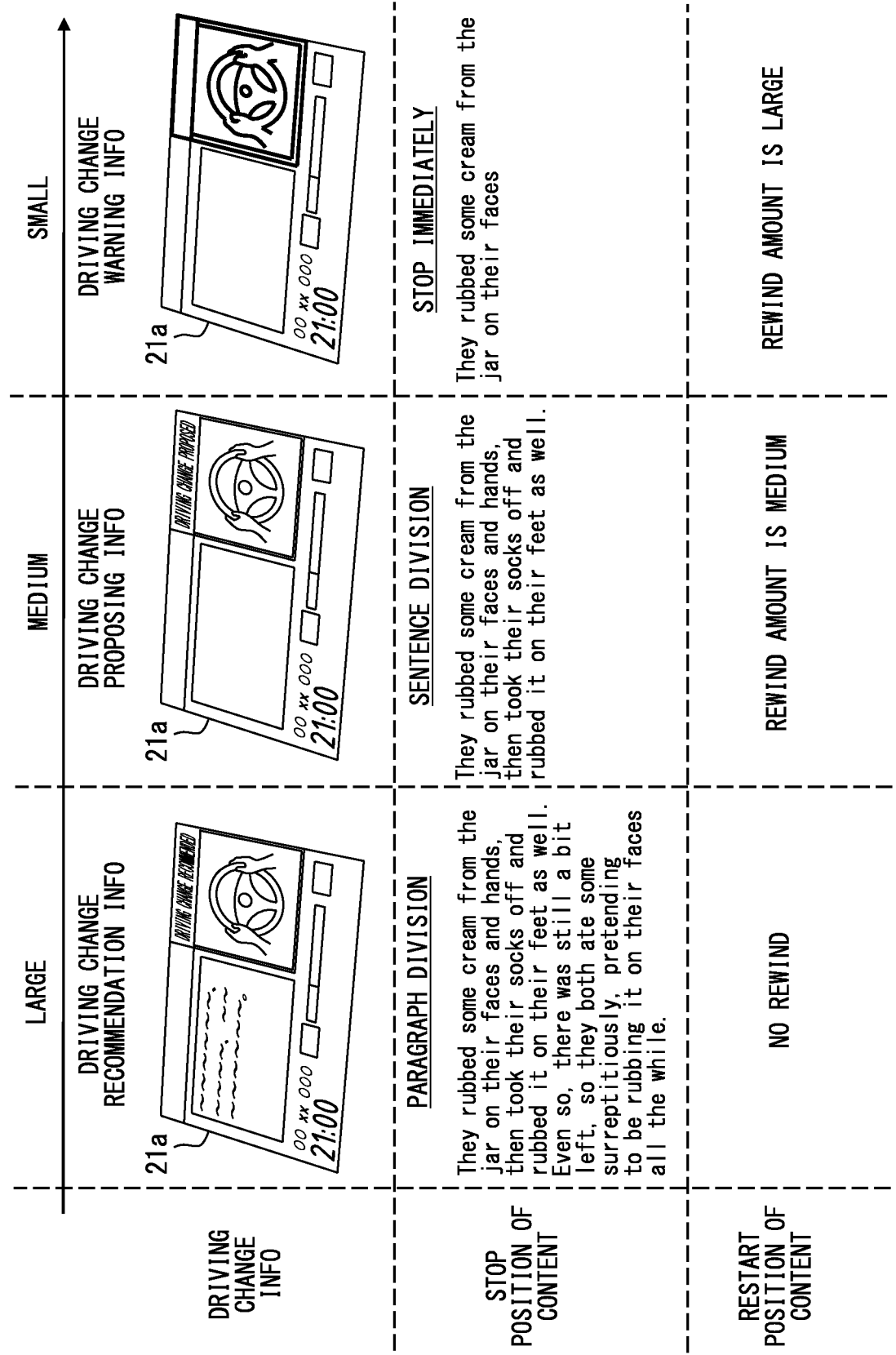
FIG. 10 is a diagram schematically showing a relationship among driving change information, a stop point, a restart point, and a margin according to a first modification example.

The following will describe a first modification. As shown in FIG. 10, in a case where the driving change information immediately before the execution of the driving change is the driving change recommendation information, that is, when the margin is large, the information presentation control unit 16 may set the restart position CP same with the stop position SP without rewinding the content from the stop position SP to the restart position CP.

The following will describe a second modification. As shown in FIG. 11, the information presentation control unit 16 may set the restart position CP same with the stop position SP without rewinding the content from the stop position SP to the restart position CP. In this case, the margin is not considered in setting of the restart position and the stop position.

In a third modification, the information presentation control unit 16 may determine whether to rewind the content from the stop position SP to the restart position CP without considering the driving load of the driver. For example, the information presentation control unit 16 may rewind the content from the stop position SP to the restart position CP regardless of the driving load of the driver. In this case, the information acquisition unit 15 does not have to acquire the driving load information.

In a fourth modification, the information presentation control unit 16 may determine the restart position CP according to the margin, and may determine the stop position SP regardless of the margin. In this case, the stop position SP may be determined, for example, at a position immediately after the driving change is performed regardless of the margin. Alternatively, the stop position SP may be is determined according to a parameter (for example, a driving load) different from the margin.

As a fifth modification, the content which is controlled so that the playback mode is changed is not limited to the audio book. For example, when the playback content is music list, a start position of each music record included in the list, such as a music album can be set as the division position.

Further, for example, when the playback content is a moving image, the stop position SP and the restart position CP may be determined without setting the division position. The information presentation control unit 16 may determine the stop position SP y seconds after the playback time corresponding to the execution of driving change. The value of y may be set according to the margin such that the value y increases with an increase of margin. The information presentation control unit 16 may determine the restart position CP z seconds before the playback time corresponding to the execution of driving change. The value of z may be set according to the margin such that the value z increases with a decrease of margin. In this way, the rewinding amount of content from the stop position SP to the restart position CP increases with a decrease of margin.

In a sixth modification, the margin obtaining unit is limited to a margin acquisition unit that acquires the margin or the information associated with the margin, such as the information acquisition unit 15. The margin obtaining unit may be a margin calculation unit that acquires the remaining amount (for example, the remaining time and the remaining distance) up to the end point of the driving change section and calculates the margin based on the acquired remaining amount.

A seventh modification is a modification of the second embodiment. In the seventh modification, the restart position CP may be set to the time when the driver's line of sight deviates from the screen 21a, or may be set to y seconds later, for example, 1 second later, than the time when the driver's line of sight deviates from the screen 21a.

In an eighth modification, the functions provided by the HCU 100 functioning as the information presentation control device and the functions provided by the autonomous driving ECU 30 may be provided by software and hardware that executes the software. For example, the functions may be provided by only software, only hardware, or a combination of software and hardware. In cases where these functions are provided by electronic circuits as hardware, the functions can be also provided by analog circuits or digital circuits which include a large number of logic circuits.

In a ninth modification, the form of the storage medium for storing the program or the like capable of realizing the above information display control method may be changed as appropriate. For example, the storage medium is not limited to the configuration provided on the circuit board, and may be provided in the form of a memory card or the like. The storage medium may be inserted into a slot portion, and electrically connected to the control circuit of the HCU 100 or the autonomous driving ECU 30. The storage medium may include an optical disk which forms a source of programs to be copied into the HCU 100 or the autonomous driving ECU 30, a hard disk drive therefor, and the like.

In a tenth modification, the information presentation control device may be a device that performs a display control function. For example, the HCU 100 and the autonomous driving ECU 30 may be integrated as one electronic control device, and this electronic control device may correspond to the information presentation control device. Alternatively, the information presentation control device may be an electronic control device integrally formed with the information presentation device 20.

As an eleventh modification, the information presentation control device may not be mounted on the vehicle 1. When the information presentation control device is not mounted on the vehicle 1 and is installed outside of the vehicle 1 or mounted on another vehicle, information may be provided by wireless communication such as the Internet, road-to-vehicle communication, vehicle-to-vehicle communication, or the like. In this case, the information presentation performed by the information presentation device 20 may be remotely controlled.

In a twelfth modification, the vehicle 1 may be configured to perform the autonomous driving at level 4 that is specified by the American Society of Automotive Engineers. In this case as well, when the vehicle 1 moves from an area where the vehicle control unit 40 can substitute the driver for the driving task to an area outside of the autonomous driving unrestricted area, the execution authority of the driving task is transferred from the vehicle control unit 40 to the driver and the driving change is performed. Thus, when the playback mode control of the content similar to the first and second embodiments is carried out, the twelfth modification can provide similar advantages. It should be noted that the vehicle 1 may be configured to temporarily stop when the driving change is performed in a state where the autonomous driving is being carried out at level 4.

As a thirteenth modification, the vehicle 1 is not limited to a general private car, but may be a rented vehicle, a vehicle for man-driving taxi, a vehicle for sharing vehicle service, a freight vehicle, a bus, or the like.

As a fourteenth modification, the driving operation device 53a is directly connected to the vehicle control actuator 52. Thus, when the driver has the authority to execute the driving task, the driving operation device 53a can directly operate the vehicle control actuator 52 without using the vehicle control unit 40.

As a fifteenth modification, the vehicle 1 may be optimized according to the road traffic law of a country or a region. Further, the information presentation control by the information presentation control device may be optimized according to the road traffic law of a country a region.

The control unit and the method thereof which have been described in the present disclosure may be also implemented by a special purpose computer which includes a processor programmed to execute one or more functions implemented by computer programs. Alternatively, the control unit and the control method described in the present disclosure may be implemented by a special purpose hardware logic circuit. Alternatively, the control unit and the control method described in the present disclosure may be implemented by one or more special purpose computers configured by a combination of a processor executing a computer program and one or more hardware logic circuits. The computer program may also be stored in a computer-readable non-transitory tangible recording medium as instructions to be executed by a computer.

The information acquisition unit 15 corresponds to a margin obtaining unit. The information presentation control unit 16 corresponds to a playback mode control unit. The HCU 100 corresponds to the information presentation control device.

It is noted that a flowchart or the process of the flowchart in the present disclosure includes multiple steps (also referred to as sections), each of which is represented, for example, as S101. Further, each step can be divided into several sub-steps while several steps can be combined into a single step.

While the present disclosure has been described with reference to embodiments, configurations, aspects of the information presentation control device, it is to be understood that the disclosure is not limited to the embodiments and constructions. The present disclosure is intended to cover various modification and equivalent arrangements. For example, embodiments, configurations, and examples obtained from an appropriate combination of technical elements disclosed in different embodiments, configurations, and examples are also included within the scope of the embodiments, configurations, and examples of the present disclosure.

What is claimed is:

1. An information presentation control device, which controls an information presentation device presenting information to a driver in a vehicle, the vehicle being configured to perform a driving task by a vehicle control unit, during an autonomous driving executed by the vehicle, the information presentation control device comprising:
a margin obtaining unit obtaining a margin of the driver until an execution of driving change in which the driver takes over the driving task being performed by the vehicle control unit; and
a playback mode control unit controlling a playback mode of a content presented by the information presentation device,
wherein the playback mode control unit:
stops the content, which is in a playback state, at a stop position in response to the execution of driving change;
sets, according to the margin of the driver, a restart position of the content to which the content is rewound from the stop position to restart a playback of the content; and
sets the restart position of the content at an earlier playback point with a decrease of the margin of the driver.

2. The information presentation control device according to claim 1, wherein
the playback mode control unit increases a rewind amount of the content from the stop position to the restart position with a decrease of the margin of the driver.

3. The information presentation control device according to claim 1, wherein
the margin obtaining unit further obtains a driving load of the driver after the execution of driving change, and
the playback mode control unit determines, according to the driving load of the driver, whether to rewind the content from the stop position to the restart position in response to the driving change.

4. The information presentation control device according to claim 1, wherein
the playback mode control unit sets the stop position of the content according to the margin of the driver.

5. The information presentation control device according to claim 4, wherein
the playback mode control unit sets the stop position of the content at a later playback point with an increase of the margin of the driver.

6. An information presentation control device, which controls an information presentation device presenting information to a driver in a vehicle, the vehicle being configured to perform a driving task by a vehicle control unit, during an autonomous driving executed by the vehicle, the information presentation control device comprising:
a margin obtaining unit obtaining a margin of the driver until an execution of driving change in which the driver takes over the driving task being performed by the vehicle control unit; and
a playback mode control unit controlling a playback mode of a content presented by the information presentation device,
wherein the playback mode control unit:
sets a stop position of the content according to the margin of the driver;
stops the content, which is in a playback state, at the stop position in response to the execution of driving change; and
sets the stop position of the content at a later playback point with an increase of the margin of the driver.

7. The information presentation control device according to claim 6, wherein
the information presentation device includes a display device that displays an image on a screen of the display device,
the playback mode includes a display of the content on the display device,
the margin obtaining unit further obtains information indicating a movement of a line of sight of the driver, and
the playback mode control unit sets a restart position of the content to which the content is rewound from the stop position to restart a playback of the content according to a time when the line of sight of the driver deviates from the content displayed on the display device.

8. An information presentation control device comprising:
a processor; and
a memory,
wherein
the information presentation control device controls an information presentation device presenting information to a driver in a vehicle,
the vehicle is configured to perform a driving task by autonomous driving, during an autonomous driving executed by the vehicle, and
the processor is configured to:
obtain a margin of the driver until an execution of driving change in which the driver takes over the driving task being performed by the autonomous driving;
control a playback mode of a content presented by the information presentation device;
stop the content, which is in a playback state, at a stop position in response to the execution of driving change;
set, according to the margin of the driver, a restart position of the content to which the content is rewound from the stop position to restart a playback of the content; and
set the restart position of the content at an earlier playback point with a decrease of the margin of the driver.

9. The information presentation control device according to claim 1, wherein
the margin of the driver is a remaining period to an end time point of a driving change section or a remaining distance to an end position of the driving change section.

10. The information presentation control device according to claim 6, wherein
the margin of the driver is a remaining period to an end time point of a driving change section or a remaining distance to an end position of the driving change section.

11. The information presentation control device according to claim 8, wherein
the margin of the driver is a remaining period to an end time point of a driving change section or a remaining distance to an end position of the driving change section.

* * * * *